United States Patent [19]

Heckmann et al.

[11] E Patent Number: Re. 32,041

[45] Reissued Date of Patent: Nov. 26, 1985

[54] CONTROL VALVE FOR VISCOUS MATERIAL PUMPS

[75] Inventors: Horst Heckmann, Sprockhövel; Werner Nawroth, Waltrop, both of Fed. Rep. of Germany

[73] Assignee: Friedrich Wilh. Schwing, GmbH, Herne, Fed. Rep. of Germany

[21] Appl. No.: 641,009

[22] Filed: Aug. 15, 1984

Related U.S. Patent Documents

Reissue of:

[64] Patent No.: 4,392,510
Issued: Jul. 12, 1983
Appl. No.: 429,020
Filed: Sep. 30, 1982

U.S. Applications:

[63] Continuation of Ser. No. 236,568, Feb. 20, 1981, abandoned.

[30] Foreign Application Priority Data

Feb. 21, 1980 [DE] Fed. Rep. of Germany ..... 3006542

[51] Int. Cl.[4] ..... F16K 27/04; F16K 3/00

[52] U.S. Cl. ..... 137/454.2; 137/625.18; 137/625.48; 251/329

[58] Field of Search ..... 137/454.2, 625.18, 625.48, 137/375, 872; 251/329, 328, 327, 326, 367; 417/516, DIG. 900, 317

[56] References Cited

U.S. PATENT DOCUMENTS

| | | | |
|---|---|---|---|
| 2,998,781 | 9/1961 | Triebel | 417/900 |
| 3,327,634 | 6/1967 | Whiteman, Jr. | 417/317 |
| 3,640,303 | 2/1972 | Verheul | 251/326 |
| 3,650,641 | 3/1972 | Reinert | 137/625.44 |
| 4,215,713 | 8/1980 | Kuhlmann | 417/900 |

FOREIGN PATENT DOCUMENTS

| | | |
|---|---|---|
| 654112 | 12/1937 | Fed. Rep. of Germany . |
| 1905706 | 2/1970 | Fed. Rep. of Germany . |
| 1813237 | 6/1970 | Fed. Rep. of Germany . |
| 1908741 | 9/1970 | Fed. Rep. of Germany . |
| 1578943 | 7/1969 | France . |

OTHER PUBLICATIONS

German Patent Application, published 12/77, GM 7727633, *Schwing*, all pages.

*Primary Examiner*—Alan Cohan
*Assistant Examiner*—John A. Rivell
*Attorney, Agent, or Firm*—Kinney & Lange

[57] ABSTRACT

A control valve for viscous material pumps has a valve plate reciprocally movable in a flat housing divided in half to control the flow channels of the valve. The plate is movable in a wear shell inlaid in the housing and having covering rings along the flow channels.

44 Claims, 7 Drawing Figures

Figure 2:
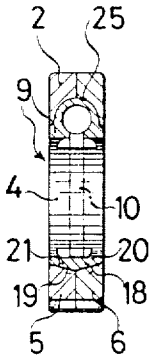

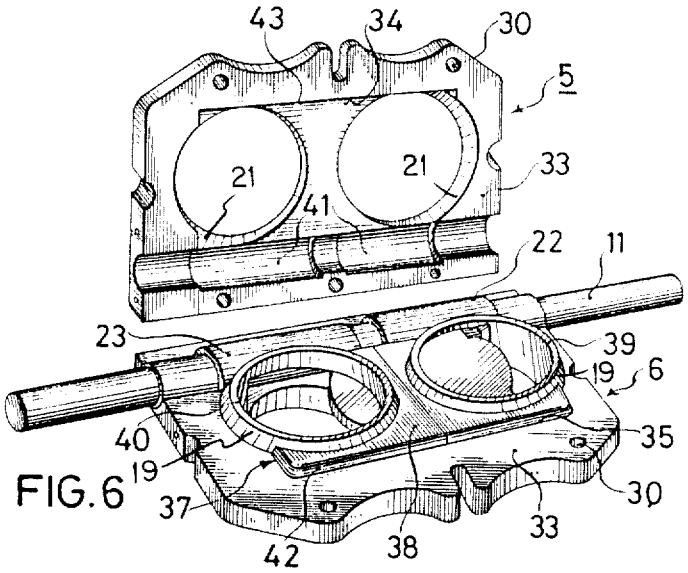
FIG. 6
FIG. 7
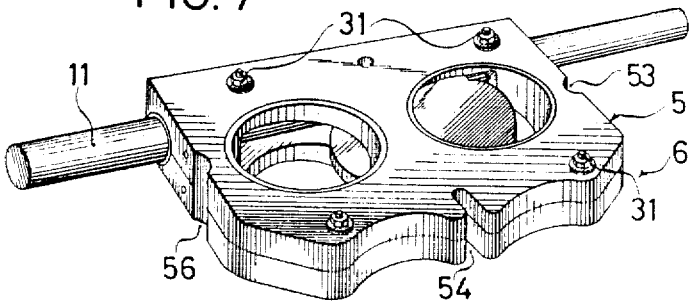

CONTROL VALVE FOR VISCOUS MATERIAL PUMPS

Matter enclosed in heavy brackets [ ] appears in the original patent but forms no part of this reissue specification; matter printed in italics indicates the additions made by reissue.

This application is a continuation application of Ser. No. 236,568, filed Feb. 20, 1981, now abandoned.

The invention relates to a control valve for viscous material pumps. The control valve has a valve plate with at least one valve rod, the plate being reciprocally movable in a flat housing for alternate in and out control of channels traversing the housing and passing the viscous material. The housing is formed of a pair of halves.

The invention relates in particular to the pumps of thick materials, which abrasively act and thus, moreover contain fine grained solid material. Therefore the invention is suited particularly for concrete pumps, because concrete contains sharp edged ingredients and cement slurry, that also separates from the water. The control valve according to the invention with its flat housing can, for example, be installed in a conduit directing means between the flanges of a hose conduit and a supply or discharge conveying conduit. Preferably, however, it is mounted on concrete pumps between the body of a reservoir and the discharge conduits of a two cylinder-piston pump and/or the supply conduit and the discharge conduits.

In such a control valve [must] high demands *must* be placed because its regular work is critical not only for the supply of the viscous material, circumstances permitting, over considerable heights and distances with the corresponding high pressures, but also the quality of the pumped viscous material is dependent somewhat on the concrete conveying. On the one hand [must] therefore the highly stressed parts of the valve slide *must* be protected against wear proceeding from the sharp edged ingredients of the viscous material, on the other hand, a good sealing is desired, particularly against the egress of the fine ingredients, as for example the cement slurry, the losses of which impair the quality of the concrete.

The initially described control valve is already known (DBP No. 19 05 706). The exterior sealing is provided by a packing sleeve which surrounds the conduit, that is drawn around on both ends of the valve slide rod and moves with these with the back and forth reciprocation of the valve slide in the dividing plane of the housing before the opening of both adjacently arranged channels.

Experience has, however, shown that the wear appears between the movable and non-movable parts of the control valve all together, because fine grained solid material is driven in the clearances existing of necessity between movable and stationary construction parts and there, on the one hand, effects friction on the parts and, on the other hand, incrementally ages; when referring to the parts of the hydraulic cement, the aging results in that the housing halves, circumstances permitting, can no longer be separated from each other.

One has made an effort to solve the wear problem among other things through inlaying and fastening of wear plates in the housing in particularly high stressed housing parts. These wear plates concern massive bodies of suitable metal alloys, which are formed out of a proportionately tough and wear resistant steel. The thereby obtainable result is naturally limited to the respective places of the housing and thus does not offer full wear protection. The replacement of the wear surfaces requires the loosening of the fastening means, for example, screws or welding seams.

One has further attempted to solve the wear problem through construction of the valve housing in compound casting. Such housings are however very complicated and difficult to connect with suitable pouring technology. Slide valve housings, which are protected with a high wear resistant outer surface in the entire region passing the viscous material, cannot, according to this proposal, be economically produced.

The present invention has as its object to provide a full wear protection in the foregoing sense, that can not only be easily mounted in the housing but also can be further removed out of same, if it is installed and should be exchanged for fresh water protection.

According to the invention [is] this object *is* attained in that the slide valve plate and the slide valve rod are movable in a wear shell surrounding them and provided with covering rings for the housings channels. The wear shell is assemblable out of a plurality of hollow bodies threadable from a side on the slide valve rod and is form lockingly inlaid in a recess of the inner sides of the housing halves. According to a preferred exemplary embodiment of the invention it is provided that the bordering edges running normal to the flat sides of the wear shell provided with the covering rings have roof formed arranged inclines, with which correspondingly inclined surfaces are arranged on the boundary edges of housing recess containing the wear shell.

The formation of the wear protection in the form of the described shell inlayable in the housing halves, that is preassembled out of a plurality of hollow bodies over the flat valve slide and the valve rod, withdraws the housing fully from the effect of the viscous material and the movable parts. As material for the cast wear shell comes in particular into consideration a chromium and vanadium containing alloy, in which [one] to a certain extent formulates toughness in order to lessen the rupture danger.

The preferred exemplary embodiment of the invention leads moreover in that the viscous material driven in the gap between movable parts and stationary parts strikes on the wear resistant material on the stationary parts, formed of the shell. For this, the initially referred to ductile metal alloys are therefore particularly suited out of which the wear shell can be cast. The mounting of such a shell basically requires clean surfaces, on which the form locking takes place, so that the wear shell as compared with the movable parts of the control slide valve is restrained during the operation. The dissassembly is problem free because the beveled surfaces, with the raising of the housing valves from the wear shell leads to corresponding force components in the surface planes, which produce shearing forces in the cement so that it, in that way, immediately loosens.

Preferably one simplifies the control valve according to the invention in that one divides the wear shell into similar hollow bodies. For this purpose, the wear shell is divided in similar halves along a separating plane running normal to the dividing plane of the housing, said halves forming a unit with the covering rings. Such an exemplary embodiment provides the possibility of realizing the wear shell with a proportionately simple casting piece.

Therefore it is also suggested to likewise divide in similar halves the control valve housing that accommodates the wear shell. Thus it is according to another exemplary embodiment of the invention that the wear shell receiving recess in the housing is formed in half in each of the pair of congruent housing halves.

On the other hand it is naturally expedient to reduce the size of the wear shell to the absolutely necessary measurements. That is accomplished with an exemplary embodiment of the invention in that the wear shell rectangular in the housing plane has arranged on at least one of its long sides, guide sleeves for a valve slide rod unitary with its hollow bodies and has on the other longitudinal side a guide unitary with the hollow bodies for a bordering edge of the sliding plate and that the small dimensions of the wear shell between the faces of the guides are bent corresponding to the covering rings. There thus results a form for the wear shell that has closed working surfaces in all directions and thus improves the form locking.

Figure 1:
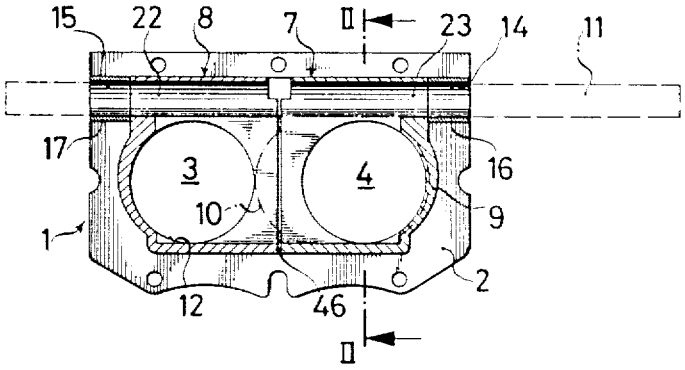
Figure 3:
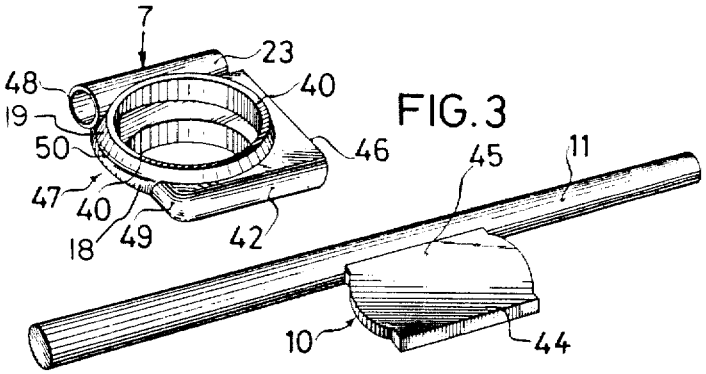
Figure 4:
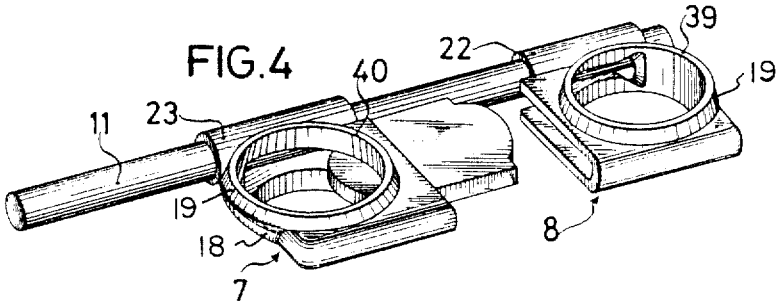
Figure 5:
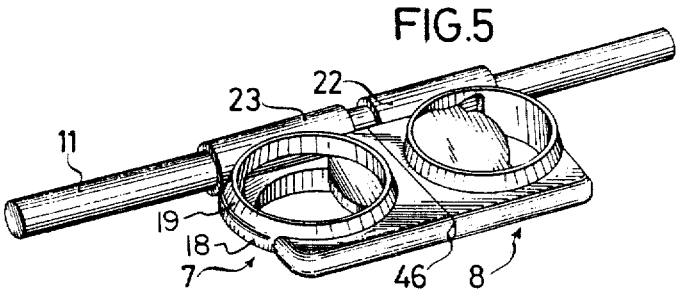

The details, further features, and other advantages of the invention will appear from the following description of an exemplary embodiment with the aid of the figures of the drawing, which show:

FIG. 1, in plan view, partially in section, an open slide valve housing according to the invention, FIG. 2, a closed slide valve housing in section along the line II—II of the FIG. 1, FIG. 3, the assembly of the wear shell over the valve plate in a first phase and in perspective view, FIG. 4, in a view corresponding to FIG. 3 a further phase with the assembly of the wear shell, FIG. 5, in a view corresponding to FIGS. 3 and 4 the finished assembled wear shell, FIG. 6, in likewise perspective view, the inlaying of the parts in the open valve housing and FIG. 7, in the view corresponding to FIG. 6, the closed housing after the final assembly.

The housing reproduced in the FIGS. 1 and 2 is, as compared with the view in the FIGS. 3–7 schematic, that is, reproduced in simplified line drawing. This view should make apparent the basic construction of the control valve according to the invention, which is indicated with 1. The flat valve housing 2 has therein two adjacently arranged flow channels 3, 4 for a viscous material, for example, concrete and is, as can be seen in FIG. 2, assembled out of two similar halves 5 and 6. On the inner side, both halves carry a recess for the mounting of the wear shell 9, for its part divided into similar halves 7, 8. The wear shell encloses the flat slide valve plate 10 reproduced in dotted lines in FIG. 1 and those parts of the valve rod 11 that are arranged adjacent the plate 10 run in the housing. The wear shell 9 is form lockingly inlaid in a closed recess 12 of the housing 2; the housing has corresponding recesses 14 and 15 through which the slide valve rod 11 is lead to the exterior. These recesses are lined with the wear sleeves 16 and 17.

As can be seen from the FIG. 2, the wear shell 9 has roof formed inclined surfaces 18 and 19 attached on its outer edges that coact with correspondingly beveled surfaces 20 and 21 of the housing.

These slanting surfaces are mounted wherever no bent surfaces of the housing or the wear shell are necessary. That is the case, with the exemplary embodiment, only in the region of the pipe-like guide parts 22, 23 of the wear shell 9 that are provided for the valve slide rod 11. These parts have rounded off outer edges, as is apparent by 25 in FIG. 2.

It is also not absolutely necessary to mount the inclined surfaces 18, 19 and 20, 21 along the entire surface of the referred to edges, because the loosening effect with the separation of the housing halves can already suffice if the inclined surfaces are arranged only outside on the referred to edges.

In the FIGS. 3–7 the details of the control valve are clearly seen.

According to FIGS. 6 and 7 the housing halves 5, 6 have a plurality of holes 30, which can be aligned with each other and accept fastening bolts 31, which fasten together both housing halves 5 and 6. The pair of housing halves 5 and 6 are similar castings and also the wear shell is formed of two similar hollow bodies 7, 8. For the assembly on the inside 33, each housing half 5, 6, is provided with a respective half 34, 35 of a recess 37 that accepts the wear shell 9. The recess is so formed that the wear shell can be fitted with a flat middle part 38 on the plane of its outer surface providing covering rings *or annular projections* 39, 40 for the channels 3, 4 mounted in the housing halves 5, 6. Moreover, the pipe guides 22, 23 are engaged by *recess* 41 and a guide 42 by *recess* 43.

As FIG. 3 shows a guide edge 44 runs in the guide 42, the former being formed as a unit on the valve plate 10 and which has, on the oppositely lying side, a fastening border 45, with which it is fastened on the sliding valve rod 11.

According to the exemplary embodiment, the wear shell 9 is, as can be seen from the example from FIG. 1, divided in similar halves along a separating plane 46 running normal to the dividing plane of the housing, said halves being carried out by the pair of hollow bodies 7, 8. Each hollow body forms an element with the covering rings 39, 40 and the parts of the guide 42 or the guide pipe 23 arranged with it. *As seen in FIGS. 3–6, the covering rings 39 and 40 of the hollow bodies 7 and 8, respectively, bear the inclined surfaces 18 and 19 thereon, with such inclined surfaces 18 and 19 coacting with the correspondingly beveled surfaces 20 and 21 of the housing as seen in FIGS. 2 and 6 and as further described above.* As a result of the described position of the separating plane 46 a narrow side [7, 8] *47* of the wear shell is formed on each half. According to the exemplary embodiment, staggered faces 48, 49 of the guide pipes 22, 23 and the guide 42 respectively, lie on this narrow side 47. Therebetween is located a bend 50 that corresponds to the curvature of the covering rings 39, 40.

As is apparent from FIG. 3, the hollow body 7 is initially threaded from the left on the guide rod 11. It is slid sufficiently far to the right until the guide border 44 or the therewith associated bend of the valve plate 10 comes into place in the corresponding inner side of the hollow body [40] *7*. In a corresponding manner the hollow body 8 is pushed from the right according to FIG. 4 until both hollow bodies rest on the separating plane 46 as is reproduced in FIG. 5.

The so assembled parts are, according to FIG. 6, inlaid from above in the lower housing part 6, that is, in the there located half 35 of the recess, after which the initially described wear sleeves 16, 17 are threaded on the ends of the valve rod 11. Then [can] the upper housing half 5 *can* be shut so that the bolts 31 can be introduced and tightened.

The housing [10] *2* can be lockingly fastened between flanges as a result of the mounted edge recess 53–56 on its circumference.

The sliding valve rod 11 coacts on both its ends with a piston, that runs with oil pressure actuated cylinders, which find use as a drive for the sliding valve plate.

We claim:

1. A control valve for viscous material pumps comprising:

a flat housing (2) having a pair of generally parallel exterior surfaces, said housing having a pair of laterally spaced viscous material channels (3, 4) extending therethrough normal to said exterior surfaces, said housing being formed of two parts (5, 6) abutting along a joinder plane lying parallel to said exterior surfaces;

a valve slide in said housing having a valve plate (10) fastened to *a* valve rod (11) for reciprocal movement within said housing across one or the other of said channels for controlling the movement of material through said channels; and a wear shell (9) mounted in said valve housing and containing said valve plate with said valve rod extending therefrom, said wear shell being formed of a pair of generally similar halves (7, 8) divided along a central plane (46) lying normal to the movement of said valve slide, said wear shell halves being assemblable to form said wear shell by threading them on opposite ends of said valve rod (11), said wear shell being formed for permitting the reciprocal movement of said valve slide and having a pair of openings aligned with said channels, said wear shell being retained in said housing by locking engagement with the interior of said housing and having annular projections (39, 40) around said openings extending into said channels (3, 4) for lining same.

2. The control valve according to claim 1 wherein the exterior of said wear shell halves and annular projections have inclined surfaces (18, 19) engaging complementary inclined surfaces (20, 21) in said housing for the locking engagement of said wear shell in said housing.

3. The control valve according to claim 1 wherein said housing contains a recess (37) in each of said two parts (5, 6) for receiving said wear shell (9).

4. The control valve according to claim 1 wherein said valve plate (10) is fastened along one edge to said valve rod (11) and wherein said wear shell has a pair of parallel sides, one of said sides having guide sleeves (22, 23) for said valve rod integrally formed with said wear shell halves, the other of said sides forming a guide (42) for said valve plate, the ends of said wear shell being convexly curved in correspondence with the annular projections of said wear shell.

5. The control valve according to claim 4 wherein the ends of said wear shell have offset surfaces (48, 49).

*6. The control valve of claim 2 wherein the material channels are circular in cross-section parallel to the housing exterior surfaces and the inclined surfaces in the housing are on each of the two parts thereof and extend from the joinder plane where the two parts of the housing abut to the exterior surface of each part of the housing and are beveled to be closer to the material channels at each of the exterior surfaces of the housing than at the joinder plane, and wherein the inclined surfaces of the wear shell are similarly shaped so that when the two parts of the housing are in abutting relation along the joinder plane the inclined surfaces of the wear shell engage the inclined surfaces of the housing to retain the wear shell in a lockingly inlaid relation within and between the two parts of the housing.*

*7. The control valve of claim 2 wherein each half of the wear shell has a pipe-like guide part having a through-bore therein for slidable reception of the valve rod of the valve slide.*

*8. The control valve of claim 7 wherein the pipe-like guide part of each half of the wear shell has rounded off outer edges which mate in an inlaid relation with similar rounded off surfaces defined in the interior of the housing.*

*9. The control valve of claim 1 wherein each of the wear shell halves is constituted as a hollow body for slidable reception of the valve slide, each hollow body has a generally U-shaped open end portion through which the valve slide slides and an opposite, partially curved closed end portion, and the U-shaped open end portions of the hollow bodies abut along and define the central plane of the wear shell.*

*10. The control valve of claim 9 wherein the valve plate has two opposite and parallel edges with one edge thereof fastened to the valve rod and the other edge defining a guide edge, and wherein each of the hollow bodies of the wear shell has a pair of parallel sides which are perpendicular to the central plane, one of the sides having a guide sleeve integrally formed with the hollow body for slidable reception of the valve rod, and the other of the sides forming a narrow guide within the hollow body for the guide edge of the valve plate.*

*11. The control valve of claim 9 wherein the valve slide has curved ends for covering a selected one or the other of the materials channels, and wherein the partially curved closed end portion of each hollow body is shaped to mate with its respective curved end of the valve slide and partially define one of the openings in the wear shell.*

*12. The control valve of claim 9 wherein each hollow body has a guide sleeve formed integrally therewith for slidable reception of the valve rod, the guide sleeve having a slot therein which extends parallel to the direction of movement of the valve slide and which communicates at one end thereof with the U-shaped open end portion of the hollow body.*

*13. The control valve of claim 3 wherein the recesses in each of the two parts of the housing are identical in configuration and the two halves of the wear shell are identical in configuration and formed to be lockingly inlaid within the recesses of the two parts of the housing when in abutting relation along the central plane to form the wear shell.*

*14. The control valve of claim 3 wherein the wear shell has a flat middle part on a planar outer surface thereof extending parallel to the movement of the valve slide which mates with a similar flat surface portion in the recess of its respective part of the housing.*

*15. The control valve of claim 4 wherein the second side of the wear shell, a portion of each end thereof and the annular projections thereon have inclined surfaces which engage complimentary inclined surfaces in the housing for lockingly inlaid engagement of the wear shell in the housing.*

*16. The control valve of claim 4 wherein each guide sleeve has rounded off outer edges which mate in an inlaid relation with similar rounded off surfaces defined in the interior of the housing.*

*17. The control valve of claim 5 wherein each end of the wear shell is defined by a portion of one of the annular projections extending between the offset surfaces.*

*18. The control valve of claim 17 wherein a portion of each end of the wear shell is convexly curved in correspondence with that portion of the annular projection extending between the offset surfaces thereof, and wherein each part of the housing has a recess defined therein of shape to mate*

*in an inlaid relation with the curved portion and offset surfaces of the ends of the wear shell.*

*19. The control valve of claim 1 wherein the wear shell is formed from a ductile metal alloy such as a chromium and vanadium containing alloy.*

*20. The control valve of claim 1 wherein each annular projection of the wear shell extends from one exterior surface to the other of the housing when the wear shell is mounted therein so that the entire depth of each material channel through the housing is lined by the wear shell.*

*21. A wear shell for use in a control valve of a viscous material pump which has a flat housing having a pair of generally parallel exterior surfaces and a pair of laterally spaced viscous material channels extending therethrough normal to the exterior surfaces and being formed of two parts abutting along a joinder plane lying parallel to the exterior surfaces, and which has a valve slide in the housing having a valve plate fastened to a valve rod for reciprocal movement within the housing across one or the other of the material channels thereof for controlling the movement of material through the channels, the wear shell comprising:*

*a pair of generally similar wear shell halves for mounting in the valve housing and containing the valve plate with the valve rod extending therefrom, the wear shell halves being divided along a central plane lying normal to the movement of the valve slide and being assemblable to form the wear shell by threading them on opposite ends of the valve slide, the wear shell being formed for permitting the reciprocal movement of the valve slide and having a pair of openings aligned with the material channels in the housing, and the wear shell being retained in the housing by locking engagement with the interior of the housing and having annular projections around the openings extending into the material channels for lining same.*

*22. The invention of claim 21 wherein the exterior of the wear shell halves and annular projections have inclined surfaces for engaging complimentary inclined surfaces in the housing to provide the locking engagement of the wear shell in the housing.*

*23. The invention of claim 22 wherein each half of the wear shell has a pipe-like guide part having a through-bore therein for slidable reception of the valve rod of the valve slide.*

*24. The invention of claim 23 wherein the pipe-like guide part of each half of the wear shell has rounded off outer edges which mate in an inlaid relation with similar rounded off surfaces defined in the interior of the housing.*

*25. The invention of claim 21 wherein each of the wear shell halves is constituted as a hollow body for slidable reception of the valve slide, each hollow body has a generally U-shaped open end portion through which the valve slide slides and an opposite, partially curved closed end portion, and the U-shaped open end portions of the hollow bodies abut along and define the central plane of the wear shell.*

*26. The invention of claim 25 wherein each hollow body has a guide sleeve formed integrally therewith for slidable reception of the valve rod, the guide sleeve having a slot therein which extends parallel to the direction of movement of the valve slide and which communicates at one end thereof with the U-shaped open end portion of the hollow body.*

*27. The invention of claim 21 wherein the wear shell has first and second parallel sides, the first side having guide sleeves for the valve rod integrally formed with the wear shell halves, the second side forming a guide for the valve plate, and the ends of the wear shell being convexly curved in correspondence with the annular projections of the wear shell.*

*28. The invention of claim 27 wherein the second side of the wear shell, a portion of each end thereof and the annular projections thereon have inclined surfaces for engaging complimentary inclined surfaces in the housing to provide lockingly inlaid engagement of the wear shell in the housing.*

*29. The invention of claim 27 wherein each guide sleeve has rounded off outer edges for mating in an inlaid relation with similar rounded off surfaces defined in the interior of the housing.*

*30. The invention of claim 21 wherein the ends of the wear shell have offset surfaces.*

*31. The invention of claim 30 wherein each end of the wear shell is defined by a portion of one of the annular projections extending between the offset surfaces.*

*32. The invention of claim 31 wherein a portion of each end of the wear shell is convexly curved in correspondence with that portion of the annular projection extending between the offset surfaces thereof, and wherein each part of the housing has a recess defined therein of shape to mate in an inlaid relation with the curved portion and offset surfaces of the ends of the wear shell.*

*33. The invention of claim 21 wherein each wear shell half is formed from a ductile metal alloy such as chromium and vanadium containing alloy.*

*34. The invention of claim 21 wherein each annular projection of the wear shell extends from one exterior surface to the other of the housing when the wear shell is mounted therein so that the entire depth of each material channel through the housing is lined by the wear shell.*

*35. A wear shell for use in a control valve of a viscous material pump which has a flat housing having a pair of generally parallel exterior surfaces and a pair of laterally spaced viscous material channels extending therethrough normal to the exterior surfaces and being formed of two parts abutting along a joinder plane lying parallel to the exterior surfaces with each part of the housing having a recess therein, and which has a valve slide in the housing having a valve plate fastened to a valve rod for reciprocal movement within the housing across one or the other of the material channels thereof for controlling the movement of material through the channels, the wear shell comprising:*

*a pair of generally similar wear shell halves for mounting in the valve housing and containing the valve plate with the valve rod extending therefrom, the wear shell halves being divided along a central plane lying normal to the movement of the valve slide and being assemblable to form the wear shell by threading them on opposite ends of the valve slide, the wear shell being formed for permitting the reciprocal movement of the valve slide and having a pair of openings aligned with the material channels in the housing, and the wear shell being received in the recesses of the parts of the housing and retained in the housing by locking engagement with the interior of the housing and each wear shell half having annular projections around the openings therein which extend into the material channels for lining same.*

*36. A wear shell for use in a control valve of a viscous material pump which has a flat housing having a pair of generally parallel exterior surfaces and a pair of laterally spaced viscous material channels extending therethrough normal to the exterior surfaces and being formed of two parts abutting along a joinder plane lying parallel to the exterior surfaces, and which has a valve slide in the housing having a valve plate and a valve rod, the valve plate being*

*fastened along one edge to the valve rod for reciprocal movement within the housing across one or the other of the material channels thereof for controlling the movement of material through the channels, the wear shell comprising:*

*a pair of generally similar wear shell halves for mounting in the valve housing and containing the valve plate with the valve rod extending therefrom, the wear shell halves being divided along a central plane lying normal to the movement of the valve slide and being assemblable to form the wear shell by threading them on opposite ends of the valve slide, the wear shell being formed for permitting the reciprocal movement of the valve slide and having a pair of openings aligned with the material channels in the housing, the wear shell having a pair of parallel sides, with one of the sides having guide sleeves integrally formed with the wear shell and the other of the sides forming a guide for the valve plate, the wear shell being retained in the housing by locking engagement with the interior of the housing and having annular projections around the openings extending into the material channels for lining same, and the ends of the wear shell being convexly curved in correspondence with the annular projections of the wear shell.*

*37. A wear shell for use in a control valve of a viscous material pump which has a flat housing having a pair of generally parallel exterior surfaces and a pair of laterally spaced, circular viscous material channels extending therethrough normal to the exterior surfaces and being formed of two parts abutting along a joinder plane lying parallel to the exterior surfaces, and which has a valve slide in the housing having a valve plate with curved ends thereon fastened to a valve rod for reciprocal movement within the housing across and for covering a selected one or the other of the circular material channels thereof and controlling the movement of material through the channels, the wear shell comprising:*

*a pair of generally similar hollow wear shell halves for mounting in the housing and for slidably containing the valve plate with the valve rod extending therefrom, the hollow wear shell halves being divided along a central plane lying normal to the movement of the valve slide and being assemblable to form the wear shell by each being threaded on an opposite end of the valve slide, the wear shell being formed for permitting the reciprocal movement of the valve slide and having a pair of openings aligned with the material channels in the housing, each hollow wear shell half having a generally U-shaped open end portion through which the valve plate slides and an opposite, partially curved closed end portion shaped to mate with its respective curved end of the valve slide and partially defined one of the openings in the wear shell, the U-shaped open end portions of the hollow wear shell halves abutting along and defining the central plane of the wear shell, and the wear shell being retained in the housing by locking engagement with the interior of the housing and having annular projections around the openings extending into the material channels for lining same.*

*38. A wear shell for use in a control valve of a viscous material pump which has a flat housing having a pair of generally parallel exterior surfaces, a pair of laterally spaced, circular viscous material channels extending therethrough normal to the exterior surfaces, being formed of two parts abutting along a joinder plane lying parallel to the exterior surfaces, and having inclined surfaces on each part thereof which extend from the joinder plane to the exterior surface of each part and which are beveled to be closer to the material channels at each of the exterior surfaces than at the joinder plane, and which has a valve slide in the housing having a valve plate fastened to a valve rod for reciprocal movement within the housing across one or the other of the material channels thereof for controlling the movement of material through the channels, the wear shell comprising:*

*a pair of generally similar wear shell halves for mounting in the housing and containing the valve plate with the valve rod extending therefrom, the wear shell halves being divided along a central plane lying normal to the movement of the valve slide and being assemblable to form the wear shell by each being threaded on an opposite end of the valve slide, the wear shell being formed for permitting the reciprocal movement of the valve slide and having a pair of openings aligned with the material channels in the housing, the wear shell having annular projections around the openings extending into the material channels for lining same, the exterior of the wear shell halves and the annular projections having inclined surfaces thereon for engaging the inclined surfaces on each part of the housing so that when the two parts of the housing are in abutting relation along the joinder plane the inclined surfaces of the wear shell engage the inclined surfaces of the housing to retain the wear shell in a lockingly inlaid relation within and between the two parts of the housing.*

*39. A wear shell for use in a control valve of a viscous material pump which has a flat housing having a pair of generally parallel exterior surfaces and a pair of laterally spaced viscous material channels extending therethrough normal to the exterior surfaces and being formed of two parts abutting along a joinder plane lying parallel to the exterior surfaces with each part of the housing having an identical recess therein adjacent the joinder plane with each recess having a flat surface portion defined therein extending parallel to joinder plane, and which has a valve slide in the housing having a valve plate fastened to a valve rod for reciprocal movement within the housing across one or the other of the material channels thereof for controlling the movement of material through the channels, the wear shell comprising:*

*a pair of identical wear shell halves for mounting in the valve housing and containing the valve plate with the valve rod extending therefrom, the wear shell halves being divided along a central plane lying normal to the movement of the valve slide and being assemblable to form the wear shell by each being threaded on an opposite end of the valve slide, the wear shell being formed for permitting the reciprocal movement of the valve slide and having a pair of openings aligned with the material channels in the housing, the wear shell having a pair of planar outer surfaces extending parallel to the movement of the valve slide with each outer surface thereof having a flat middle part thereon which is generally disposed between and adjacent to the openings in the wear shell, the flat middle part on each outer surface of the wear shell being shaped to mate with the flat surface portion in the recess of its respective part of the housing, each identical wear shell half being of configuration to be retained in the housing by lockingly inlaid engagement in the recesses of the parts of the housing, and each wear shell half having annular projections around the openings therein which extend into the material channels for lining same.*

*40. A wear shell for use in a control valve of a viscous material pump which has a flat housing having a pair of generally parallel exterior surfaces and a pair of laterally spaced, circular viscous material channels extending therethrough normal to the exterior surfaces, the housing being formed of two congruent parts abutting along a joinder plane lying parallel to the exterior surfaces, each part of the housing having an identical recess therein adjacent the joinder plane with portions of each recess having rounded-off surfaces and inclined surfaces which extend from the joinder plane to the exterior surface on each part and with the inclined surfaces being beveled to be closer to the material channels at the exterior surface on each part than at the joinder plane, and which has a valve slide in the housing having a valve plate and a valve rod, the valve plate having two opposite and parallel side edges and two opposite convexly curved end edges with one side edge thereof fastened to the valve rod and the other side edge defining a guide edge, and the valve plate of the valve slide being positioned for reciprocal movement within the housing across and for covering a selected one or the other of the circular material channels thereof and controlling the movement of material through the channels, the wear shell comprising:*

*a pair of identical hollow wear shell halves for mounting in the housing and for slidably containing the valve plate with the valve rod extending therefrom, the hollow wear shell halves being divided along a central plane lying normal to the movement of the valve slide and being assemblable to form the wear shell by each being threaded on an opposite end of the valve slide, the wear shell being formed for permitting the reciprocal movement of the valve slide and having a pair of circular openings aligned with the circular material channels in the housing, each hollow wear shell half having a generally U-shaped open end portion through which the valve plate slides and an opposite, partially curved closed end portion shaped to mate with its respective curved end edge of the valve plate and partially define one of the openings in the wear shell, and each hollow wear shell half having a pair of parallel sides which are perpendicular to the central plane, one of the sides having a pipe-like guide sleeve integrally formed with said hollow wear shell half with the guide sleeve having a slot therein extending parallel to the movement of the valve slide and which communicates at one end with the U-shaped open end portion of said hollow wear shell half for slidable reception of the valve plate and the other side of said hollow wear shell half forming a narrow guide within said hollow wear shell half for the guide edge of the valve plate, the wear shell having annular projections around the circular openings thereon and the guide sleeves having rounded-off edges and the exterior of the wear shell halves and the annular projections having inclined surfaces thereon for engaging the rounded-off and inclined surfaces on the recess of each part of the housing so that when the two parts of the housing are in abutting relation along the joinder plane the rounded-off and inclined surfaces of the wear shell engage the rounded-off and inclined surfaces of the recesses in the housing to retain the wear shell in a lockingly inlaid relation within the recesses and between the two parts of the housing, and the annular projections on the wear shell extending from one exterior surface to the other of the housing when the wear shell is mounted therein so that the entire depth of each material channel through the housing is lined by the wear shell.*

*41. A wear shell for use in a control valve of a viscous material pump which has a flat housing having a pair of generally parallel exterior surfaces and at least one circular viscous material channel extending therethrough normal to the exterior surfaces and being formed of two congruent parts abutting along a joinder plane lying parallel to the exterior surfaces, and which has a valve slide in the housing having a valve plate fastened to a valve rod for movement within the housing across said at least one material channel thereof for controlling the movement of material through the channel, the wear shell comprising:*

*a hollow body for mounting in the housing and partially containing the valve plate with the valve rod extending therefrom, the hollow body being assemblable to form the wear shell by being threaded on an end of the valve slide, the hollow body being formed for permitting reciprocal movement of the valve slide and having a circular opening aligned with said at least one material channel in the housing, and the hollow body being retained in the housing by locking engagement with the interior of the housing and having annular projections around the opening extending into the material channel for lining same.*

*42. A wear shell for use in a control valve of viscous material pump which has a flat housing having a pair of parallel exterior surfaces and at least one circular viscous material channel extending therethrough normal to the exterior surfaces and being formed of two congruent parts abutting along a joinder plane lying parallel to the exterior surfaces with each part of the housing having an identical recess therein adjacent the joinder plane and which has a valve slide in the housing having a valve plate fastened to a valve rod for movement within the housing across said at least one material channel thereof for controlling the movement of material through the channel, the wear shell comprising:*

*a hollow body for mounting in the housing and partially containing the valve plate with the valve rod extending extending therefrom, the hollow body being formed for permitting reciprocal movement of the valve slide and having a circular opening aligned with said at least one material channel in the housing when mounted therein, and the hollow body being of configuration to be retained in the housing by lockingly inlaid engagement in the recesses of the parts of the housing and having annular projections around the opening therein which extend into the viscous material channel from one exterior surface to the other of the housing when the hollow body is mounted therein so that the entire depth of the material channel is lined by the hollow body.*

*43. A wear shell for use in a control valve of a viscous material pump which has a flat housing having a pair of generally parallel exterior surfaces and at least one circular viscous material channel extending therethrough normal to said exterior surfaces and being formed of two congruent parts abutting along a joinder plane lying parallel to said exterior surfaces, wherein each part of the housing has an identical recess having rounded-off surfaces and inclined surfaces which extend from the joinder plane to the exterior surface on each part and with the inclined surfaces being beveled to be closer to the material channel at the exterior surface on each part than at the joinder plane, and which has a slide valve in the housing having a valve plate and a valve rod wherein the valve plate has two opposite and parallel side edges and two opposite end edges*

*with at least one of said end edges being convexly curved and with one side edge thereof fastened to the valve rod and the other side edge defining a guide edge, and wherein the valve plate of the valve slide is positioned for movement within the housing across and for covering said at least one circular viscous material channel thereof and controlling the movement of material through the channel, the wear shell comprising:*

*a hollow body for mounting in the valve housing and for partially and slidably containing the valve plate and the valve rod extending therefrom, the hollow body being formed for permitting the reciprocal movement of the valve slide and having a circular opening aligned with said at least one circular viscous material channel in the housing, the hollow body having a generally U-shaped open end portion through which the valve plate slides and an opposite, partially curved closed end portion shaped to mate with said at least one convexly curved end edge of the valve plate and partially define said circular opening in the hollow body, the hollow body having a pair of parallel sides which are parallel to the movement of the valve slide, one side of the hollow body having a pipe-like guide sleeve integrally formed with the hollow body with the guide sleeve having a slot therein extending parallel to the movement of the valve slide and which communicates at one end with the U-shaped open end portion of the hollow body for slidable reception of the valve plate and the other side of the hollow body forming a narrow guide within the hollow body for the guide edge of the valve plate, the hollow body having an annular projection around the circular opening thereon and the guide sleeve having rounded-off edges and the exterior of the hollow body and the annular projections having inclined surfaces for engaging the rounded-off and inclined surfaces on the recess of each part of the housing so that when the two parts of the housing are in abutting relation along the joinder plane the rounded-off and inclined surfaces of the hollow body engage the rounded-off and inclined surfaces of the recesses in the housing to retain the hollow body in a lockingly inlaid relation within the recesses and between the two parts of the housing, and the annular projections on the hollow body extending from one exterior surface to the other of the housing when the hollow body is mounted therein so that the entire depth of the material channel through the housing is lined by the hollow body.*

*44. A method of assembling a control valve for a viscous material pump which comprises the steps of:*

*threading one half of a wear shell with an opening therein onto one end of a valve rod of a valve slide;*

*threading another similar half of a wear shell with an opening therein onto the other end of the valve rod until the wear shell halves abut along a separating plane lying normal to the valve rod to form a wear shell with a pair of laterally spaced openings which encloses a valve plate fastened to the valve rod with said valve rod extending therefrom for permitting reciprocal movement of the valve plate of the valve slide across one or the other of the openings;*

*laying the wear shell containing the valve plate with the valve rod extending therefrom into a recess formed on an inner side of a lower housing half of a valve housing so that annular projections formed around the openings on the wear shell extend into a pair of laterally spaced viscous material channels in the lower housing half and so that inclined surfaces on the wear shell engage complimentary inclined surfaces on the lower housing half in a lockingly inlaid relation;*

*placing an upper housing half which is identical to the lower housing half onto the the lower housing half in a mating relation along a joinder plane defined by the inner sides of the housing halves so that a similar recess on the upper housing half engages the wear shell in a lockingly inlaid relation, similar material channels on the upper housing half have the openings of the wear shell aligned therewith and the annular projections of the wear shell extending therein, and similar complimentary inclined surfaces on the upper housing half engage inclined surfaces on the wear shell; and*

*fastening the lower and upper housing halves lockingly together to form a housing for the control valve.*

* * * * *

UNITED STATES PATENT AND TRADEMARK OFFICE

CERTIFICATE OF CORRECTION

PATENT NO. : Re. 32,041

DATED : November 26, 1985

INVENTOR(S) : Horst Heckmann et al

It is certified that error appears in the above-identified patent and that said Letters Patent is hereby corrected as shown below:

In claim 42, lines 40-41, the words "extending extending" should read --extending--.

Signed and Sealed this

*Fourth* Day of *March 1986*

[SEAL]

*Attest:*

DONALD J. QUIGG

*Attesting Officer*

*Commissioner of Patents and Trademarks*